3,003,990
RUBBER COMPOUNDED AND HEAT TREATED WITH COATED FILLER
Carl W. Umland II and Albert M. Gessler, Cranford, and Winthrope C. Smith, Westfield, N.J., assignors to Esso Research and Engineering Company, a corporation of Delaware
No Drawing. Filed Aug. 21, 1957, Ser. No. 679,522
4 Claims. (Cl. 260—38)

The present invention relates to compounding rubber or synthetic rubber with a coated mineral filler. More specifically, it concerns compounding butyl rubber with a coated kaolin clay and heating the combination to produce a product having improved physical properties.

Kaolin, or china clays have been used as rubber fillers and reinforcing agents for a number of years. However, it has recently been found that, when kaolin clay-butyl rubber blends are heated to a temperature of 250° F. or higher, their physical properties are strongly affected. These clays cannot be employed in heat treating butyl rubber which generally requires use of temperatures in excess of 250° F. In fact, at higher temperatures the clay depolymerizes the butyl rubber, and under certain conditions reduces it to a putty-like substance.

It has now been discovered that if these clays are coated with a substance, such as resin, prior to heat treating them with the butyl but, rather, will enhance its physical properties, particularly its modulus.

Of the rubbery polymers that are improved by heat treating them with coated kaolin clay, butyl rubber is preferred because it reacts to the desired degree with the coated mineral filler. Butyl rubber is a copolymer of a major proportion of an olefin such as relatively low molecular weight isoolefin (e.g. isobutylene) and a minor proportion of a multiolefin, preferably having a ratio of the isoolefin to the multiolefin of about 90–99.5% to about 10–0.5% respectively. Copolymers of the above general type, especially where the copolymer is above about 85% (and especially above about 90%) to about 99.5% of a $C_4$–$C_7$ isoolefin such as isobutylene with about 15–0.5% (preferably about 10–0.5%) of a multiolefin of about 4–14 carbon atoms are commonly referred to in patents and literature as "butyl rubber" or GR–I rubber (Government Rubber–Isobutylene) more recently IIR (Isobutylene Isoprene Rubber) and, for example, is referred to as "butyl rubber" in patents and in the textbook "Synthetic Rubber" by G. S. Whitby, 1954 edition, pages 608–609, etc. The preparation of butyl-type rubbers is described in U.S. Patent 2,356,128 to Thomas et al, and also in other patents as well as in literature. In general, the synthetic rubber comprises a copolymer of isobutylene and a multiolefin such as isoprene, butadiene, dimethyl butadiene, myrcene, piperylene, etc. The copolymer of isobutylene and isoprene is preferred.

Usually the copolymer has a Staudinger molecular weight within the range between about 20,000 and 100,000. The iodine number (Wijs) is in the range from about 0.5 to 50, preferably in the range from about 1 to 20. The above copolymer when cured has good elasticity, tensile strength, abrasion resistance and flexure resistance.

According to one embodiment of the present invention, butyl rubber is compounded with a kaolin clay, of the type described by Gongrower in India Rubber World, 118, 793–795 (1948), which has been previously coated with a resin, and heated to a temperature of 250° F. or higher, but not above about 420° F. The heat treated butyl rubber is then allowed to cool and, upon reaching the desired temperature, it may be compounded further with fillers, such as carbon black or clay, curing agents, accelerators, stabilizers, etc., and cured at an elevated temperature, e.g., 250°–450° F.

Kaolin is a corruption of the Chinese word "Kauling" which is interpreted to mean a ridge or hill. Kaolin clays are generally classified as being hard or soft, depending upon whether they produce a rubber compound having high modulus, etc. A soft clay produces a rubber having a lower modulus, tensile strength and resistance to abrasion. The preferred clay is an intermediate to hard clay. Kaolin clay or Kaolinite has the following general formula:

$$Al_2O_3 \cdot 2SiO_2 \cdot 2H_2O$$

A chemical analysis of typical Georgia or South Carolina kaolin clays revealed that the $Al_2O_3$ content may vary between 38 and 40 wt. percent and the $SiO_2$ content is between 44 and 47 wt. percent. Pure uncalcined kaolinite contains 39.50 wt. percent aluminum trioxide and 46.54 wt. percent silicon dioxide. The clays have a specific gravity of about 2.60 and a particle size such that at least 80% of the clay is 2 microns or less. An aqueous slurry of these clays may have a pH between 4.0 and 7.0; however, it is usually between pH 4.0 and 5.0. It is believed that the particle size distribution, rather than the chemical composition or geological location of these clays, is the most important property in distinguishing between hard and soft clays, though probably the size distribution, chemical composition and perhaps also the combined moisture content, all interact to produce the results obtained. Among the commercially available clays which have been found suitable for the purposes of the present invention are Suprex sold by J. M. Huber Corp., Champion clay sold by Harwick Standard Chemical Co., Crown clay sold by Southeastern Clay Co., and the ASP clays sold by Minerals & Chemicals Corporation of America.

The amount of kaolin clay employed will vary according to the physical properties desired. For instance, as little as 20 parts by weight or as much as 400 parts by weight of coated kaolin clay may be compounded with 100 parts by weight of butyl rubber and heat treated according to the present invention. For most purposes, it has been found that between about 50 and 200 parts by weight per 100 parts of butyl rubber will result in a vulcanizate having the desired properties.

The coating agent may be a nitrogen-containing compound, such as ethylene diamine, or a resin, especially the condensation product of an aldehyde and a material of the group consisting of urea, alkylated urea, phenol, alkyl-substituted phenols, e.g., p-t-butyl phenol, t-amyl phenol, octyl phenol, etc., and polyhydric phenol, e.g., resorcinol. The aldehyde-containing resins are highly desirable because they not only coat the kaolin clay to prevent it from depolymerizing butyl rubber at elevated temperatures but it is though that they also react with the butyl rubber to improve the reinforcing characteristics of the clay. The kaolin clay may be coated in any suitable manner which will result in clay particles having a film of resin ranging between 0.5–5.0 wt. percent on clay. The method used to coat the kaolin clays employed in the examples comprises mixing the clay with the resin's monomers and spray drying the mixture. To illustrate this, a water-dispersible condensation product of an aldehyde and urea is intimately mixed with an aqueous slurry of kaolin clay together with sufficient acid or alkali to adjust the pH of the mixture to the point of maximum stability of the condensation product. To promote optimum dispersion of clay, a suitable dispersing or setting agent, such as sodium tetrapyrophosphate, or trisodium phosphate, may be employed. The mixture thus formed is introduced into a spray chamber through a suitable spray head or mechanical atomizer where the water is vaporized and the physically bonded clay and condensation product are subsequently separated from the exhaust vapor stream. This latter step may be accomplished by any suitable mechanism, such as a cycloneseparator. The clay can also be mixed with an aqueous dispersion of pre-formed resin.

The optimum conditions for spray drying vary according to the characteristics of the particular spray drying equipment utilized, the particular condensation product or amine employed, the weight ratio between condensation product and clay and the proportion of water in the slurry. The clay and the water dispersion or water solution of condensation product may be admixed to make a slurry at room temperature. The slurry is fed into the spray dryer where it is treated by admixture with heated gas (e.g., air or products of combustion). The temperature of the gas as introduced into the spray drying chamber is related to the rate of feed of the slurry into the spray drying chamber so that at the upper reaches of the chamber where the high temperature gas comes in contact with the atomized slurry not all of the moisture in the slurry is driven off. The result is that the condensation product is maintained at a temperature not substantially higher than 212° F. and hence below the maximum temperature of condensation of the condensation product. The partly dried clay particles fall by gravity through the spray drying chamber. While the clay particles are falling, further evaporation of water thereon occurs, the heat previously absorbed by the clay and condensation product assisting in the evaporation. Thus, the temperature of the clay and the condensation product thereon is lowered below 212° F. and continues to drop as the clay particles covered with condensation product fall to the bottom of the drying chamber, the withdrawal of heat from the clay due to the evaporation of the moisture on the clay particles having a refrigerating effect on the condensation product to rapidly cool it to inhibit its advancement.

The coated clay may be compounded with the butyl rubber in any suitable manner, such as in a Banbury mixer or on a mill, at a temperature of 250° to 420° F. In addition to the coated clay, between 3 and 50 phr. (parts per 100 parts of rubber) of a metal oxide, such as zinc oxide, and 0 to 5 phr. of a dispersion agent, such as stearic acid, may be present during the heat treatment. It may also be desirable in certain instances to include about 0.1 to 2 phr. of a nitroso or quinone heat interaction promoter. Among the promoters which have been successfully used in this manner are para-dinitroso benzene, meta-dinitroso benzene, para-quinone dioxime, N nitroso-N-methyl para-nitroso aniline, etc. These promoters serve to enhance the bond between the coated mineral filler and the butyl rubber.

The heat-treated rubbery polymer may be cured with sulfur, sulfur-containing substances or compounds, or quinone compounds, by heating the polymer and curing agent to a temperature of 250° F. to 400° F. for from a few minutes to several hours. For example, the cure may be accomplished in the presence of such compositions as (1) zinc oxide and sulfur, (2) zinc oxide and tetramethyl thiuram disulfide, (3) dialkyl polythiocarbamates, (4) lead oxide and para-quinone dioxime with or without sulfur, (5) para-quinone dioxime dibenzoate, lead oxide and sulfur, etc. For vulcanization purposes, the butyl rubber polymer may be compounded as follows:

| Component | General Range, phr. | Preferred Range, phr. |
|---|---|---|
| Metal Oxide (e.g. zinc oxide) | 1–50 | 2–30 |
| Mold Release Agent (e.g. stearic acid) | 0–5 | 0–2 |
| Curing Agent | 0–10 | 0–5 |
| Accelerator | 0–5 | 0–2 |
| Anti-oxidant (e.g. N-lauroyl para-amino phenol) | 0–5 | 0–2 |

Prior to curing the butyl rubber, various fillers and plasticizers may be compounded with it. The preferred plasticizers are naphthenic or paraffinic hydrocarbon oils having an SSU viscosity at 100° F. of between 90 and 1300.

The butyl rubber-mineral filler compositions prepared according to the present invention may be used in window channels, water-proof goods, gaskets, tires, and other items wherein rubber-filler compositions are employed.

The substances used to coat the clay play an important part in determining the physical properties of the vulcanizate. For instance, certain butyl rubber reactive resins such as those obtained by condensing a para-hydrocarbon substituted phenol with formaldehyde in the presence of sodium hydroxide, greatly enhance the modulus of the cured butyl rubber. While the aldehyde may be any of those which readily condense with urea or phenol, the preferred aldehyde is formaldehyde. The amount of resin on the clay is not critical as long as it sufficiently covers the surface of the kaolinite, thus preventing its depolymerizing effect. Generally, the resin comprises about 0.5 to 5 wt. percent of the filler and preferably about 1 to 3 wt. percent.

The following examples are given as illustrations of the present invention.

EXAMPLE 1

A number of experiments were carried out to demonstrate the beneficial effect brought about by coating kaolin clay with various polymers. The coating prevents the kaolin clay from depolymerizing the butyl when it is heat treated with it.

100 parts by weight of isoprene-isobutylene butyl rubber (GRI–18) having a mole percent unsaturation of 1.5 was compounded with 5 parts by weight of zinc oxide, 1 part by weight of stearic acid and 130 parts by weight of kaolin clay coated by the spray drying technique described above. In each case the butyl rubber was compounded in a Banbury mixer using a 10-minute cycle wherein a temperature of 320°–330° F. was obtained and held for the last 5 minutes of mixing. The compounded rubber was cooled and further compounded as follows on a cold laboratory mill:

| Ingredient | Parts by Weight |
|---|---|
| Sulfur | 1.5 |
| Tellurium diethyl diethiocarbamate | 2 |
| Mercaptobenzothiazole | 1 |

The compounded butyl rubber was then evaluated with the Mooney viscometer.

| Run No. | | Mooney Viscosity [1] |
|---|---|---|
| 1 | Kaolin Clay (control-no heat treatment) | 86 |
| 2 | Kaolin Clay (control-heat treatment) | 21 |
| 3 | Kaolin Clay (2% para-octyl phenol-formaldehyde resin) | 93.5 |
| 4 | Kaolin Clay (5% butyl urea-formaldehyde resin) | 89.5 |
| 5 | Kaolin Clay (5.33% urea-formaldehyde resin) | 96 |

[1] Large rotor @ 212° F. after 8 minutes.

The above data show that the coated kaolin clay did not reduce the Mooney viscosity of the butyl rubber when the mixture was heated in a Banbury mixer at 320°–330° F. while the untreated clay reduced the compounded butyl rubber viscosity to 21.

Samples of each of the recipes were cured for 30, 45, and 60-minute periods at 287° F. The physical properties of the vulcanizates are set forth below:

*Table I*

| Run No | 1 | 2 | 3 | 4 | 5 |
|---|---|---|---|---|---|
| Physical Properties: | | | | | |
| Tensile Strength, p.s.i.— | | | | | |
| Cure: | | | | | |
| 30′ @ 287° F | 1,200 | (1) | 1,240 | 1,280 | 760 |
| 45′ @ 287° F | 1,350 | (1) | 1,030 | 960 | 620 |
| 60′ @ 287° F | 1,440 | (1) | 1,215 | 910 | 540 |
| 100% Modulus, p.s.i.— | | | | | |
| Cure: | | | | | |
| 30′ @ 287° F | 180 | (1) | 310 | 270 | 380 |
| 45′ @ 287° F | 200 | (1) | 330 | 295 | 320 |
| 60′ @ 287° F | 230 | (1) | 350 | 320 | 330 |
| 300% Modulus, p.s.i.— | | | | | |
| Cure: | | | | | |
| 30′ @ 287° F | 300 | (1) | 510 | 440 | 380 |
| 45′ @ 287° F | 320 | (1) | 520 | 460 | 430 |
| 60′ @ 287° F | 350 | (1) | 540 | 475 | 450 |
| Elongation, Percent— | | | | | |
| Cure: | | | | | |
| 30′ @ 287° F | 685 | (1) | 645 | 665 | 595 |
| 45′ @ 287° F | 665 | (1) | 585 | 580 | 465 |
| 60′ @ 287° F | 645 | (1) | 580 | 535 | 385 |
| Shore "A" Hardness: | | | | | |
| Cure: | | | | | |
| 30′ @ 287° F | 60 | (1) | 60 | 65 | 65 |
| 45′ @ 287° F | 60 | (1) | 61 | 67 | 67 |
| 60′ @ 287° F | 62 | (1) | 63 | 68 | 69 |

[1] Depolymerized in Banbury.

The results in Table I show that by coating the kaolin clay with resin it is possible to avoid depolymerizing the butyl rubber during the heat treatment step and, in addition, the vulcanizate has superior properties to that obtained by co-mixing the kaolin clay with the butyl rubber. For instance, in the case of the para-octyl phenol-formaldehyde-coated clay the modulus at 300% elongation was as much as 70% greater than the control which was not subjected to heat treatment.

The kaolin clay used in the above experiment was mined in Wilkinson County, Georgia, U.S.A. and had an average particle size of 0.55 micron (range 0.1–5 microns). This clay contains 38.79 wt. percent aluminum trioxide and 45.42 wt. percent silicon oxide and has a specific gravity of 2.58.

The para-octyl phenol-formaldehyde condensate is a resin sold by Rohm & Haas Co. under the trade name "Amberol ST-137" which is believed to be a reaction product of formaldehyde and para-octyl phenol prepared in an alkaline medium. The butyl urea-formaldehyde and urea-formaldehyde condensates were prepared according to well-known techniques.

EXAMPLE 2

Example 1 was repeated using hard kaolin clays coated with various nitrogen-containing compounds, e.g., amines. The results are set forth in Table II:

*Table II*

| Coating | 1 wt. percent ethylene diamine acetate [1] | 2 wt. percent ethylene diamine acetate [1] | 2 wt. percent ethylene diamine rosinate [1] | 1 wt. percent octyl amine acetate |
|---|---|---|---|---|
| Mooney Viscosity, large rotor @ 212° F., 8 min | 106 | 106.5 | 102.5 | 91 |
| Tensile Strength, p.s.i.: | | | | |
| Cure— | | | | |
| 30′ @ 287° F | 1,015 | 1,095 | 1,050 | 1,350 |
| 45′ @ 287° F | 930 | 1,060 | 845 | 1,260 |
| 60′ @ 287° F | 820 | 1,210 | 1,135 | 1,130 |
| 100% Modulus, p.s.i.: | | | | |
| Cure— | | | | |
| 30′ @ 287° F | 300 | 250 | 245 | 210 |
| 45′ @ 287° F | 330 | 290 | 280 | 230 |
| 60′ @ 287° F | 350 | 310 | 310 | 250 |
| 300% Modulus, p.s.i.: | | | | |
| Cure— | | | | |
| 30′ @ 287° F | 430 | 390 | 355 | 330 |
| 45′ @ 287° F | 450 | 445 | 420 | 350 |
| 60′ @ 287° F | 510 | 495 | 465 | 370 |
| Elongation, percent: | | | | |
| Cure— | | | | |
| 30′ @ 287° F | 605 | 605 | 630 | 695 |
| 45′ @ 287° F | 555 | 575 | 550 | 630 |
| 60′ @ 287° F | 500 | 580 | 590 | 600 |
| Shore "A" Hardness: | | | | |
| Cure— | | | | |
| 30′ @ 287° F | 65 | 66 | 65 | 64 |
| 45′ @ 287° F | 66 | 68 | 67 | 65 |
| 60′ @ 287° F | 66 | 69 | 69 | 65 |

[1] Coating was reacted with stoichiometric quantity of acetic acid or rosin acid required to neutralize one of the amines.

The data show that the amine coating is effective in preventing the hard kaolin clay from breaking down the butyl polymer. The normal octyl amine acetate coated clay produced a vulcanizate having superior properties than that of the "no heat-treatment" control in Example 1. For instance, the 30-minute cured sample had a tensile strength which was 150 p.s.i. more; an elongation 10% more; and a 300% modulus which was 30 p.s.i. more. Of course, other curing systems and ingredients may be employed to regulate these properties according to the desires of the manufacturer.

Resort may be had to various modifications and variations of the present invention without departing from the spirit of the discovery or the scope of the appended claims.

What is claimed is:

1. In a process for treating butyl rubber copolymer of 85–99.5% $C_4$ to $C_7$ isoolefin and 0.5–5.0% $C_4$ to $C_{14}$ multiolefin with kaolin clay having the general formula $Al_2O_3 \cdot 2SiO_2 \cdot 2H_2O$, wherein the $Al_2O_3$ content varies between 38 and 40 weight percent, the $SiO_2$ content varies between 44 and 47 weight percent, the specific gravity is about 2.60, and the particle size of 80% of the clay is about 2 microns; the improvement which comprises mixing an aqueous slurry of said clay with a water-dispersible condensation product of formaldehyde and a material selected from the group consisting of urea, alkylated urea, phenol, an alkyl-substituted phenol, and a polyhydric phenol with subsequent drying to coat said clay with said condensation product adjacent hereto; compounding said rubber with said coated clay; and curing said compounded rubber at a temperature of at least 250° F. to provide an improved vulcanizate therefrom.

2. In a process for treating butyl rubber copolymer of 85–99.5% $C_4$ to $C_7$ isoolefin and 0.5–5.0% $C_4$ to $C_{14}$ multiolefin with kaolin clay having the general formula $Al_2O_3 \cdot 2SiO_2 \cdot 2H_2O$, wherein the $Al_2O_3$ content varies between 38 and 40 weight percent, the $SiO_2$ content varies between 44 and 47 weight percent, the specific gravity is about 2.60, and the particle size of 80% of the clay is about 2 microns; the improvement which comprises mixing an aqueous slurry of said clay with a water-dispersible condensation product of formaldehyde and urea with subsequent drying to coat said clay with said condensation product adjacent hereto; compounding said rubber with said coated clay; and curing said compounded rubber at a temperature of at least 250° F. to provide an improved vulcanizate therefrom.

3. A composition of matter comprising butyl rubber copolymer of 85–99.5% $C_4$ to $C_7$ isoolefin with 0.5–5.0% $C_4$ to $C_{14}$ multiolefin and kaolin clay having the general formula $Al_2O_3 \cdot 2SiO_2 \cdot 2H_2O$, wherein the $Al_2O_3$ content varies between 38 and 40 weight percent, the $SiO_2$ content varies between 44 and 47 weight percent, the specific gravity is about 2.60, and the particle size of 80% of the clay is about 2 microns; said composition being prepared by mixing an aqueous slurry of said clay with a water-dispersible condensation product of formaldehyde and a material selected from the group consisting of urea, alkylated urea, phenol, an alkyl-substituted phenol, and a polyhydric phenol with subsequent drying to coat said clay with said condensation product adjacent hereto; compounding said rubber with said coated clay; and curing said compounded rubber at a temperature of at least 250° F. to provide an improved vulcanizate therefrom.

4. A composition of matter comprising butyl rubber copolymer of 85–99.5% $C_4$ to $C_7$ isoolefin with 0.5–5.0% $C_4$ to $C_{14}$ multiolefin and kaolin clay having the general formula $Al_2O_3 \cdot 2SiO_2 \cdot 2H_2O$, wherein the $Al_2O_3$ content varies between 38 and 40 weight percent, the $SiO_2$ content varies between 44 and 47 weight percent, the specific gravity is about 2.60, and the particle size of 80% of the clay is about 2 microns; said composition being prepared by mixing an aqueous slurry of said clay with a water-dispersible condensation product of formaldehyde and urea with subsequent drying to coat said clay with said condensation product adjacent hereto; compounding said rubber with said coated clay; and curing said compounded rubber at a temperature of at least 250° F. to provide an improved vulcanizate therefrom.

References Cited in the file of this patent

UNITED STATES PATENTS

| | | |
|---|---|---|
| 2,692,870 | Pechukas | Oct. 26, 1954 |
| 2,692,871 | Pechukas | Oct. 26, 1954 |
| 2,697,699 | Cohn | Dec. 21, 1954 |
| 2,702,286 | Iknayan et al. | Feb. 15, 1955 |
| 2,771,936 | Iknayan et al. | Nov. 27, 1956 |

FOREIGN PATENTS

| | | |
|---|---|---|
| 665,474 | Great Britain | Jan. 23, 1952 |